US008677355B2

(12) United States Patent
Spradlin et al.

(10) Patent No.: US 8,677,355 B2
(45) Date of Patent: Mar. 18, 2014

(54) VIRTUAL MACHINE BRANCHING AND PARALLEL EXECUTION

(75) Inventors: Jeremiah C. Spradlin, Woodinville, WA (US); Dominique Fortier, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 451 days.

(21) Appl. No.: 12/972,424

(22) Filed: Dec. 17, 2010

(65) Prior Publication Data

US 2012/0159478 A1   Jun. 21, 2012

(51) Int. Cl.
*G06F 9/455* (2006.01)

(52) U.S. Cl.
USPC ................................................ 718/1; 703/23

(58) Field of Classification Search
None
See application file for complete search history.

(56) References Cited

U.S. PATENT DOCUMENTS

| | | | |
|---|---|---|---|
| 7,664,626 B1 | 2/2010 | Ferrie | |
| 7,784,053 B2 | 8/2010 | Casey et al. | |
| 8,151,263 B1 * | 4/2012 | Venkitachalam et al. | 718/1 |
| 2006/0155735 A1 * | 7/2006 | Traut et al. | 707/101 |
| 2007/0192765 A1 | 8/2007 | Shimogawa et al. | |
| 2008/0163210 A1 | 7/2008 | Bowman et al. | |
| 2008/0184225 A1 * | 7/2008 | Fitzgerald et al. | 718/1 |
| 2009/0037885 A1 | 2/2009 | Edwards et al. | |
| 2009/0094603 A1 * | 4/2009 | Hiltgen et al. | 718/1 |
| 2010/0005464 A1 | 1/2010 | Malyugin et al. | |
| 2010/0070678 A1 | 3/2010 | Zhang et al. | |
| 2010/0083251 A1 * | 4/2010 | McCrory et al. | 718/1 |
| 2010/0114825 A1 | 5/2010 | Siddegowda | |
| 2010/0138208 A1 | 6/2010 | Hattori et al. | |
| 2011/0191341 A1 * | 8/2011 | Meyer et al. | 707/736 |
| 2012/0110574 A1 * | 5/2012 | Kumar | 718/1 |
| 2012/0291030 A1 * | 11/2012 | Fitzgerald et al. | 718/1 |

OTHER PUBLICATIONS

Tarighi, et al., "A New Model for Virtual Machine Migration in Virtualized Cluster Server Based on Fuzzy Decision Making", Retrieved at << http://arxiv.org/ftp/arxiv/papers/1002/1002.3329.pdf >>, Journal of Telecommunications, vol. 1, No. 1, Feb. 2010, pp. 40-51.

Beck, et al., "Syscall Interception in Xen Hypervisor", Retrieved at << http://hal.archives-ouvertes.fr/docs/00/43/10/31/PDF/Technical_Report_Syscall_Interception.pdf >>, Nov. 10, 2009, pp. 22.

(Continued)

*Primary Examiner* — Jennifer To
(74) *Attorney, Agent, or Firm* — William Hwang; Micky Minhas (57) ABSTRACT

A state branching system is described herein that allows parallel execution of complex state transitions while leveraging time invested to setup a starting state. By allowing branching at the virtual machine level, the state branching system allows setup of a particular condition or state in a virtual machine, then copying and branching to parallel instances of the virtual machine to explore different possible subsequent states. Upon detecting a large state change with unknown outcome, the state branching system instructs the hypervisor to copy the executing virtual machine into one or more separate virtual machines. The system then allows divergent branching between the two or more virtual machines to explore different states from a similar starting point. Once the executions have reached the next state, the system coordinates to determine which copies will continue execution. Thus, the state branching system allows faster exploration of complex state changes.

18 Claims, 4 Drawing Sheets

(56) References Cited

OTHER PUBLICATIONS

Grantner, et al., "The Virtual Fuzzy Automaton Approach to the Problem of Global State Evaluation in Multitask Control Systems", Retrieved at << http://homepages.wmich.edu/~grantner/images/FUZZ-IEEE99.pdf >>, 1999 IEEE International Fuzzy Systems Conference Proceedings, Aug. 22-25, 1999, pp. 283-288.

Cully, et al., "Remus: High Availability via Asynchronous Virtual Machine Replication", Retrieved at << http://www.cs.northwestern.edu/~fabianb/classes/eecs-443-w09/lectures/Remus.pdf >>, Feb. 25, 2009, pp. 27.

"International Search Report", Mailed Date: Jul. 30, 2012, Application No. PCT/US2011/064754, Filed Date: Dec. 14, 2011, pp. 9.

\* cited by examiner

VIRTUAL MACHINE BRANCHING AND PARALLEL EXECUTION

BACKGROUND

Branching can refer to any point in a computer program where execution proceeds down multiple potential paths. There are a variety of types of branching in computer science. At the machine level, software assembly language instructions often contain conditional jumps. If the condition succeeds, the processor will execute code at the location specified by the jump. If the condition fails, the processor will continue executing code following the jump. Today's heavily pipelined, multi-core processors often begin speculatively executing both paths of a branch. When execution reaches the branch condition and the condition is evaluated, the processor keeps the branch taken and flushes the intermediate results of speculatively executing the other branch. Branching also occurs at the process level. Operating systems such as UNIX include application programming interfaces (API), such as fork( ) that creates a copy of a process and continues executing in a new process. This can be used for multithreading or for pursuing divergent potential paths of a process.

Testing complex systems often involves a fair amount of setup to get the system to a particular condition and then test the system's reaction to a variety of stimuli. The stimuli may include providing a variety of inputs, in the form of fuzz testing, manipulating connected hardware to test the system's reaction, and so forth. Some functions of a system may produce substantial state changes, such that it is difficult to get back to the previous condition. In other instances, complex systems may spend a long amount of time processing a batch of data only to find out that the data was not needed, or that a branch will be taken that causes the data to be unimportant.

Branching today applies at too low of a level to be helpful in these situations. Testing of complex systems and other fields need a way to start from a known state and explore multiple potential future states, without consuming too much time and requiring laborious setup. Typically today, a test harness will run multiple possible test passes serially or in more efficient cases may leverage multiple machines to run tests in parallel. This can still be time consuming, particularly if the test harness needs to get each machine to a common state to start multiple tests. For complex state evaluations, the time involved may mean less time for testing the system in as many permutations as the software developer would like, and as a result more errors in the software product.

SUMMARY

A state branching system is described herein that allows parallel execution of complex state transitions while leveraging time invested to setup a starting state. The system works by modifying a hypervisor to allow branching at a virtual machine level. By allowing branching at the virtual machine level, the state branching system allows setup of a particular condition or state in a virtual machine, then copying and branching to parallel instances of the virtual machine to explore different possible subsequent states. The issue arises frequently for larger and more complex evaluations, especially if the state of the machine is dramatically affected by these evaluations. Upon detecting or being informed of a large state change with unknown outcome(s), the state branching system instructs the hypervisor to copy the executing virtual machine into one or more separate virtual machines. The system then allows divergent branching between the two or more virtual machines (the original and the copy) to explore different states from a similar starting point. Once the executions have reached the next state, the system coordinates to determine which copy or copies will continue execution. Thus, the state branching system allows faster exploration of complex state changes that substantially modify the state of a computer system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A state branching system is described herein that allows parallel execution of complex state transitions while leveraging time invested to setup a starting state. The system works by modifying a hypervisor to allow branching at a virtual machine level. A hypervisor manages one or more virtual machine processes that share resources (e.g., processor, memory, disk, and network) of a physical machine. Although all of the virtual machines run on the same physical machine, each generally is unaware of and isolated from the other virtual machines. By allowing branching at the virtual machine level, the state branching system allows setup of a particular condition or state in a virtual machine, then copying and branching to parallel instances of the virtual machine to explore different possible subsequent states. The issue arises frequently for larger and more complex evaluations, especially if the state of the machine is dramatically affected by these evaluations. One example is fuzzing, where being able to branch an entire operating system within a virtual machine allows a software developer to dramatically decrease the time spent setting up the next iteration to be fuzzed and allows for faster exploration of the possible execution paths to be fuzzed.

Upon detecting or being informed of a large state change with unknown outcome(s), the state branching system instructs the hypervisor to copy the executing virtual machine into one or more separate virtual machines. The system then allows divergent branching between the two or more virtual machines (the original and the copy) to explore different states from a similar starting point. In some embodiments, the application can call into the hypervisor to allow the hypervisor to spawn the existing virtual machine's state and spawn a duplicate copy or copies into a new virtual machine. The system then allows the copies to coordinate their decision trees so they do not overlap. Once the executions have reached the next state, the system coordinates to determine which copy or copies will continue execution. In some cases, the system may branch briefly into multiple virtual machines, explore a few states, and then combine the results back into the original virtual machine until the next major state change repeats the process.

In some embodiments, the state branching system depends on both hypervisor and operating system modifications to allow virtual machine level branching. The operating system includes an ability to detect when a branch is desirable. This can involve many potential triggers, such as first chance exception notifications, application requests, user mode second chance exceptions, and so forth. The operating may also include an API or other means for an application to specify which decision point should be modified per branching instance. The hypervisor is modified to expose commands to allow the host or guest operating system to request a duplication of an existing guest operating system instance. The hypervisor can also freeze execution of the guest operating system, preventing any hardware interrupts from provoking execution on the guest operating system. In addition, the hypervisor instructs the memory management unit (MMU) to duplicate the entire guest operating memory allocations for the new branch instance. In some cases, the system may not duplicate all memory, but rather only some data pages and possibly no executable pages, depending on the level of branching support the hypervisor provides. In this way, either the host or guest operating determines when a decision point has been reached that would benefit from parallel evaluation of divergent paths, and requests a branch at the virtual machine level from the hypervisor and/or operating system. Thus, the state branching system allows faster exploration of complex state changes that substantially modify the state of a computer system.

Figure 1:
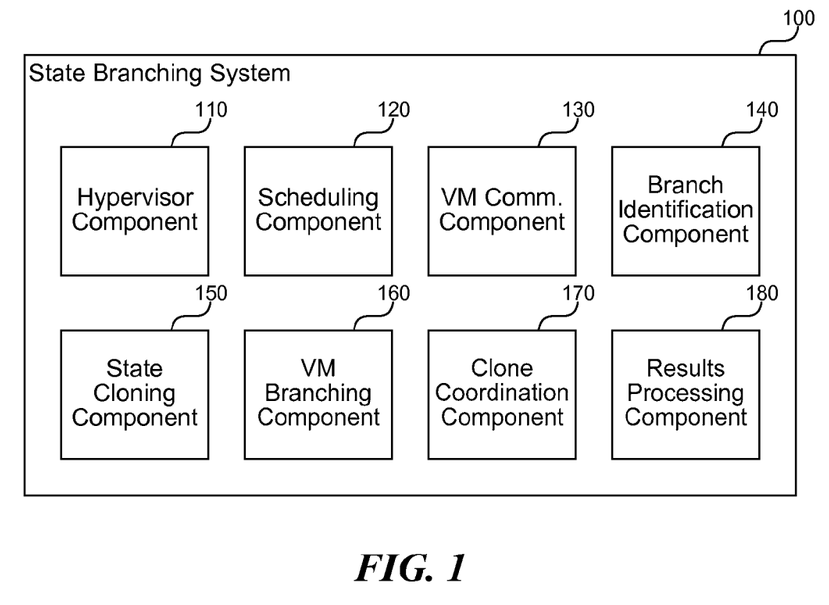
FIG. 1 is a block diagram that illustrates components of the state branching system, in one embodiment.

FIG. 1 is a block diagram that illustrates components of the state branching system, in one embodiment. The system 100 includes a hypervisor component 110, a scheduling component 120, a VM communication component 130, a branch identification component 140, a state cloning component 150, a VM branching component 160, a clone coordination component 170, and a results processing component 180. Each of these components is described in further detail herein.

The hypervisor component 110 shares resources of a physical computing device between two or more virtual computing devices. Many datacenters now use virtual machines to allow multiple production applications to run on a single server, each within a virtual environment so that each application thinks it has exclusive use of the machine. Instead, the application typically has exclusive use of the virtual machine, but shares physical resources. The virtual machine provides the application with a guaranteed amount of hardware resources, such as central processing unit (CPU) speed, memory size, disk capacity, network bandwidth, and so forth. Hypervisors are widely available for commodity hardware that can allow multiple virtual machines to run side by side on the same computer (e.g., Xen, Hyper-V, and VMWare). The hypervisor multiplexes (and sometimes schedules) access to the physical resources such as CPU, memory, disk, and network. The hypervisor provides schedulers for both CPU and I/O resources that are capable of providing a fixed partition of all resources between two or more virtual machines. This can be done in many ways, e.g. using hard-real time scheduling algorithms.

The scheduling component 120 provides scheduling of resource usage on a physical machine and resource isolation between two or more virtual machines, including an original virtual machine and a cloned virtual machine. The scheduling component 120 may operate within the hypervisor and provide virtual machine isolation so that each virtual machine can use physical machine resources in a way that meets any guarantees provided to each virtual machine for resource availability. For example, if a physical machine has a 2 GHz processor and each of two virtual machines has been guaranteed equivalent specific portion of the processor's time, then the scheduling component 120 may ensure that each virtual machine gets to use one-half of the physical machine's processor time. The scheduling component 120 can provide similar divisions of physical machine memory, disk space, network bandwidth, and other resources.

The VM communication component 130 provides one or more channels of communication between two or more virtual machines. A variety of techniques exists for cross-VM communication, including shared physical memory, hyper calls that call into the hypervisor, storing files at a common location on a physical disk, and so forth. The VM communication component 130 may receive coordination information from an original virtual machine and provide coordinating instructions to one or more clone virtual machines. The coordination information may ensure that each virtual machine follows a different branch to evaluate multiple possible states. The hypervisor may manage the shared communication channel and enforce security or other restrictions on the virtual machines. The original virtual machine may leverage support within the hypervisor for creating clones and coordinating activities between them.

The branch identification component 140 identifies a present state and one or more subsequent states of software code that are candidates for branching an original virtual machine running the software code to evaluate the subsequent states in one or more clone virtual machines. The component 140 may identify potential branches automatically by analyzing the software code or may be directed by the application where to branch. Automatic identification of branches occurs similar to CPUs today, where an analysis engine can look multiple steps into the upcoming instruction stream and identify instructions, functions, or other behavior that will substantially alter the state of the machine. Manual identification can occur by a software developer programming a test or other application to request branching at particular locations. For example, a test may setup state common to several tests and then notify the host operating system to request a branch to execute the divergent paths that each of the tests pursues.

The state cloning component 150 copies state information from the original virtual machine to create one or more clone virtual machines having similar state. The copying may copy the entire memory and other virtual hardware of the original virtual machine, or may select only a subset to be used for exploring the divergent state that each clone will pursue. For example, a test may close numerous operating system handles of various types that take a long time to open. The original virtual machine may perform the work of opening all of the handles, while the clone virtual machines each close a particular type of handle to test various conditions. In this example, each clone virtual machine pursues a separate state, but may only need a copy of the state related to the handles or more generally to the test application running on the virtual machine, rather than all state information or other applications.

The VM branching component 160 executes the branch by starting each created clone virtual machine and identifying a branch of execution for each clone to pursue. For example, if the branch identification component 140 identifies five possible paths coming up in software code that each results in a substantially different state, then a test application may direct the state cloning component 150 to create four clones, where the original virtual machine will pursue one of the states while the four clone virtual machines will pursue the remaining four states. The VM branching component 160 informs each clone virtual machine of the branch that it will consider, such as by directly setting the instruction pointer and other machine state to the location and state surrounding the branch. The VM branching component 160 then allows each virtual machine to execute to explore the divergent states.

The clone coordination component 170 coordinates actions of each clone virtual machine and the original virtual machines to allow discarding unneeded branches or merging branch results. The purpose of executing different branches is to find out where execution ends up. In many cases, software code may pursue one of several branches then end up in a common location with a result that differs based on the branch taken. Thus, it is common to execute widely divergent code for a brief period after the branch, but to then later converge at a common location to consider the result. The clone coordination component 170 allows a test or other application code to send multiple clone virtual machines off to do some work to consider various states, but then to complete the circle by considering the result of each clone virtual machine and transferring execution back to the original virtual machine when the exploration of states is complete. This is similar to how a CPU today may speculatively execute several branches and then flush those that do not end up being taken, but is applied by the state branching system 100 on a much broader scale at the virtual machine level.

The results processing component 180 processes results produced by each virtual machine and provides the results to the clone coordination component 170. Each virtual machine the original and the clones, may produce a variety of results, including a simple numeric or text result or complex results such as further state changes that occur to the virtual machine. As one example, an antivirus program may want to execute several identified software code modules found on a computing device being scanned for malicious code to determine if the code modules do anything harmful to the computing device. The antivirus program can spawn each software code module in a clone virtual machine that has all of the characteristics of the original computing device, the results being any changes that the software code makes to the clone. The antivirus program can scan the results to determine if any are harmful (e.g., deleting significant files or spamming contacts), and can provide a Boolean result to the original application indicating whether harmful results were found. This allows each clone to potentially mess up the state of the clone virtual machine in some way, but then to be discarded by the antivirus program after the particular result is obtained. As another example, an embedded device using the system can be designed to ping a network to determine whether it should perform some complex action and how. This branching would allow the device to use the physical device's idle processing power while the high-latency request was made. Perhaps this involves the calculation to recalibrate a sensor or antenna array, and the embedded device can begin the possible calculations prior to the receipt of the network response.

The computing device on which the state branching system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
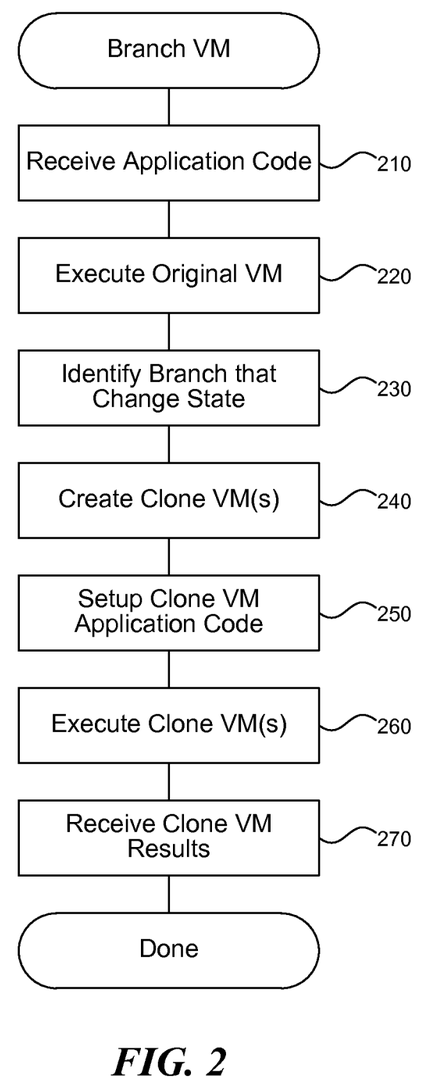
FIG. 2 is a flow diagram that illustrates processing of the state branching system to branch from an original virtual machine to one or more clone virtual machines to consider divergent states, in one embodiment.

FIG. 2 is a flow diagram that illustrates processing of the state branching system to branch from an original virtual machine to one or more clone virtual machines to consider divergent states, in one embodiment. Beginning in block 210, the system receives application code for execution on an original virtual machine, wherein the application code includes at least one branch that results in two or more possible states of the virtual machine. The system may receive a test or other application code that changes the state of the machine, and branches may occur based on conditions evaluated at runtime. The system identifies branches that substantially alter the state of the original virtual machine and executes one or more clone virtual machines in parallel to evaluate the paths leading from the branch.

Continuing in block 220, the system executes the original virtual machine including the received application code. For example, the system may operate within a hypervisor and direct execution of multiple virtual machines sharing the same physical resources. The system executes the original virtual machine until a branch is identified that potentially significantly changes the virtual machine state. For example, the branch may delete files, perform a long computation, create a large amount of data, or perform other state changing operations.

Continuing in block 230, the system identifies a branch in the application code running on the original virtual machine that results in two or more possible states of the virtual machine. For example, the system may automatically identify the branch by using code analysis tools well known in the art to find divergent paths in the software code. Many static and runtime analysis tools inspect software code at the binary and/or source code level and identify locations of significant divergence in application state. In some embodiments, the system may allow the application to indicate a location where the application will branch into multiple possible states. For example, a test application may invoke an operating system API that identifies two or more branch paths so that the system can clone the virtual machine and execute the paths in parallel.

Continuing in block 240, the system creates one or more clone virtual machines that duplicate a current state of the original virtual machine and then process one path of the branch to explore a subsequent state in the created clone virtual machine. Cloning may include setting up virtual machine specifications that identify virtual hardware, copying memory state of the original virtual machine, copying disks attached to the original virtual machine, and so forth. Some virtualization software stores virtual machines in a single file, including any embedded file system (e.g., VHD files used by MICROSOFT™ Virtual PC and Hyper-V). The system may clone the virtual machine by pausing execution of the original virtual machine and copying one or more files associated with the virtual machine.

Continuing in block 250, the system sets up each clone virtual machine to execute a different path of the identified branch. If the clones were perfect clones of the original, they would each do the same thing as the original next. However, one purpose of the state branching system is to allow each clone to pursue a different path of the branch in parallel. Thus, the system sets up each clone with information about which path it is responsible for exploring, and then executes each clone and the original to allow it to explore its assigned path. Setting up each clone may include identifying software code that the virtual machine will run, setting the instruction pointer and register state to a particular location, and so on.

Continuing in block 260, the system executes the original virtual machine and cloned virtual machines to explore at least two paths of the identified branch in parallel. If a particular path of the branch significantly alters the machine state, only the virtual machine executing that branch will be affected. Meanwhile, the original virtual machine may wait to determine effects of executing the cloned virtual machines to gather information about the branch paths without affecting the original virtual machine state. If the application code determines that conditions are not met to take a branch path, the virtual machine(s) related to that path can simply be discarded and the original virtual machine can continue. In some cases, the system may select a clone virtual machine to continue as the main virtual machine (i.e., taking over the role of the original virtual machine) and the original virtual machine may terminate.

Continuing in block 270, the system receives at least one execution result from the cloned virtual machines. The result may indicate a state reached by the cloned virtual machine, information communicated from the cloned virtual machine through a cross-VM communication channel, output produced by executing a branch path executed by the cloned virtual machine, and so forth. The original virtual machine may use the execution result to determine what to do next or to select a virtual machine whose result the original virtual machine will continue processing. Because the cloned virtual machines are executed in parallel, the system will likely reach a result faster than would have been possible trying each branch within the original virtual machine. After block 270, these steps conclude.

Figure 3:
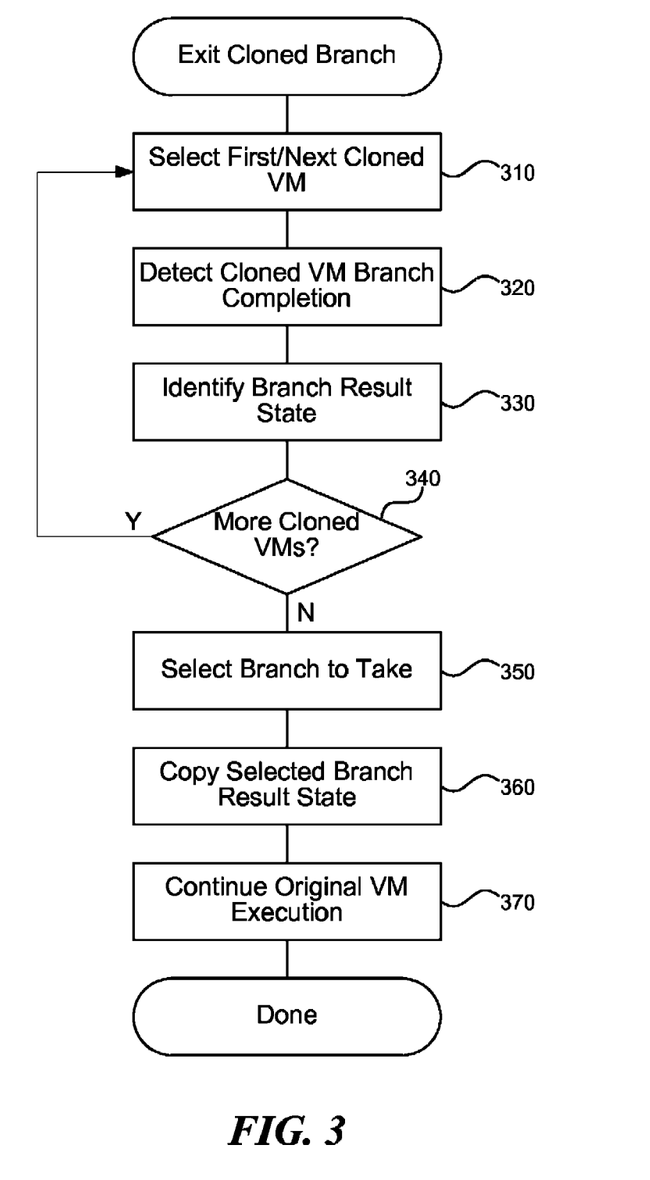
FIG. 3 is a flow diagram that illustrates processing of the state branching system to exit one or more clone virtual machines and converge execution back to an original virtual machine, in one embodiment.

FIG. 3 is a flow diagram that illustrates processing of the state branching system to exit one or more clone virtual machines and converge execution back to an original virtual machine, in one embodiment. Beginning in block 310, the system selects a first cloned virtual machine created by previously detecting branches of application code in an original virtual machine and spawning a cloned virtual machine to execute each branch path. On subsequent iterations, the system selects the next cloned virtual machine.

Continuing in block 320, the system detects that the selected cloned virtual machine has completed execution of the branch path to which it was assigned. In some cases, the branch path may represent a small subsection of a larger body of code, wherein the subsection produces result or changes state in a way that it is useful to isolate execution of the branch to determine its result outside of the larger body of code. During setup of the cloned virtual machine, the system may insert an instruction (e.g., a halt or interrupt) or other indication at a point when the cloned virtual machine will have completed execution of the branch path. The hypervisor or other code can monitor for and detect the instruction to detect completion of the cloned virtual machine.

Continuing in block 330, the system identifies a result state of executing the cloned virtual machine. The result may include numeric results, data produced by the cloned virtual machine, state changes to the cloned virtual machine, and so on. The system may compare the cloned virtual machine to the original virtual machine to identify changes produced by exploring the branch path executed by the cloned virtual machine. If the original virtual machine decides to take the path speculatively executed by the branch, then the original virtual machine can copy the selected cloned virtual machine's state differences or identified result.

Continuing in decision block 340, the system determines whether there are more cloned virtual machines associated with a current branch. If so, the system loops to block 310 to select the next cloned virtual machine, else the system continues at block 350 after each cloned virtual machine has been processed.

Continuing in block 350, the system selects a branch to take based on one or more conditions in the application code running on the original virtual machine. In some embodiments, the cloned virtual machines operate as speculative execution engines for speculatively executing branch paths that the original virtual machine might take. After the original virtual machine executes to a point that all conditions have been evaluated to know which path will be taken, the original virtual machine can select one of the branches as the correct branch and discard the others. In other embodiments, the cloned virtual machines may represent cumulative results all of which are used by the original virtual machine, but that are executed in parallel to reach the results faster. In such cases, the original virtual machine receives a result from each cloned virtual machine, performs any further processing on the received results, and continues after the cloned virtual machines are done.

Continuing in block 360, the system copies the identified result state from the cloned virtual machine that executed that selected branch. In this way, the original virtual machine benefits from the parallel execution performed by the individual cloned virtual machine. No matter which branch was taken, the original virtual machine was not disturbed by the testing of each branch and did not have to wait to serially execute the branch after preceding code was completed. Rather, while the preceding code completed in the original virtual machines, the cloned virtual machines each executed one of the branches, and the selected virtual machine provides the result to the original virtual machine as soon as it is ready (and before the original virtual machine would have been able to attain the result itself).

Continuing in block 370, the system continues execution of the original virtual machine using the copied result from the cloned virtual machine. In some embodiments, the system may discard the original virtual machine and continue execution through the selected cloned virtual machine. The system can discard or "flush" any cloned virtual machines that represent branch paths not taken. After block 370, these steps conclude.

Figure 4:
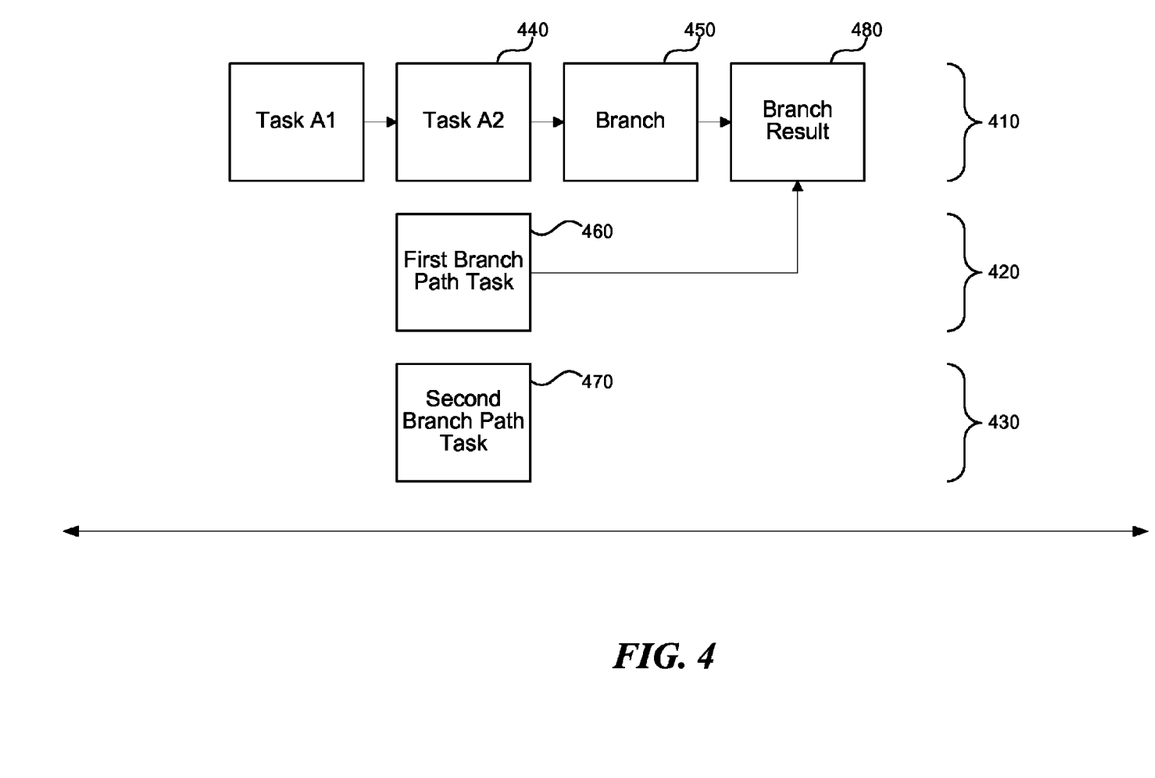
FIG. 4 is a timeline diagram that illustrates parallel processing of branch paths by the state branching system, in one embodiment.

FIG. 4 is a timeline diagram that illustrates parallel processing of branch paths by the state branching system, in one embodiment. The first row 410 of the timeline represents processing of the original virtual machine described herein. In a traditional system, the original virtual machine or a physical machine would perform all of the processing. The original virtual machine processes one or more tasks 440 before encountering a branch 450 in the application code the original virtual machine is executing. At some point before the branch, the original virtual machine identifies the branch and spawns two cloned virtual machines that execute potential paths of the branch in parallel. The second row 420 represents the processing of a first cloned virtual machine and the third row 430 represents the processing of a second cloned virtual machine. While the original virtual machine completes the pre-branch tasks 440, the first cloned virtual machine executes code associated with a first branch path 460 and the second cloned virtual machine executes code associated with a second branch path 470 in parallel. When the original virtual machine reaches the branch 450, it determines a path of the branch to take based on the current state of the original virtual machine and any conditions of the branch 450. The original virtual machine selects the winning branch and copies the result 480 to the original virtual machine. Then the original virtual machine continues execution, discarding the cloned virtual machines. In this way, the cloned virtual machines prepared the future state of the original virtual machine in parallel and isolated the original virtual machine from invasive state changes that may have been involved in evaluating each branch path.

In some embodiments, the state branching system provides a framework for device driver testing. Device driver testing is often difficult because it involves physical hardware and state changes that, if handled incorrectly, could deadlock in the kernel space of the operating system. The state branching system allows virtualizing the state changes of the physical hardware so that multiple clone virtual machines operating in parallel can evaluate the results of various potential hardware inputs and the corresponding driver response. This facilitates faster and more robust development of device driver software code.

In some embodiments, the state branching system determines a threshold for spawning additional virtual machines for exploring branch paths. The creation and setup of virtual machines incurs a certain cost in terms of time and resource usage. For small branches, the time involved in setting up cloned virtual machines may not be worth the benefit gained from them. Thus, the system may determine a threshold related to the benefit of using a cloned virtual machine and only spawn new cloned virtual machines when the tradeoff will ultimately save execution time or provide other positive results. The application may be able to set or tune the threshold based on application-specific considerations. Similarly, in some embodiments, the state branching system may consider whether the cloned virtual machines will affect any resources outside of the cloned virtual machine (i.e., issuing a command to an external or linked physical device, sending packets over a network, etc.) when evaluating the benefit of using cloned virtual machines for exploring branch paths.

In some embodiments, the state branching system spawns cloned virtual machines on a different physical machine than the original virtual machine. Virtual machines are well suited to easy movement between physical machines, and the system may offload exploration of various branch paths to other physical machines by executing some or all of the cloned virtual machines on a separate physical machine. The cloned virtual machines can communicate with the original virtual machine, if needed, via a network or other communication channel between the physical machines.

In some embodiments, the state branching system provides notifications from the hypervisor upon detecting an opportunity for using cloned virtual machines for exploring branch paths. The hypervisor can monitor each running process in a virtual machine and automatically detect instances in which a separate virtual machine can prepare for a branch path in parallel. In such cases, the hypervisor can provide an application notification that the application can register for and respond to indicating whether the application wants the hypervisor to spawn a cloned virtual machine.

In some embodiments, the state branching system provides a new form of debugging that provides the effect of traveling back in time to various states of an application running on a virtual machine. The system creates checkpoints at various points in the application's execution in the form of cloned virtual machines. Each cloned virtual machine represents the application's state at a particular point in time and is isolated from any subsequent changes that occurred to the application. This allows a software developer to attach a debugger and inspect the application state at one or more points in time before or during a problem occurring.

In some embodiments, the state branching system provides A-B testing for comparing similar algorithms for performing various tasks. For example, the system can test operating system paging or scheduling algorithms by setting each up in a separate cloned virtual machine with a similar set of processes to manage, and then executing each cloned virtual machine in parallel to determine which algorithm provides better results, in terms of either faster execution or other factors. Re-running such tests today serially introduces new state. Even though a test harness attempts to set up the same state every time, something invariably changes making comparisons difficult. Using the state branching system, each test starts with a known cloned state and the results can be compared with less influence from unexpected state changes.

From the foregoing, it will be appreciated that specific embodiments of the state branching system have been described herein for purposes of illustration, but that various modifications may be made without deviating from the spirit and scope of the invention. Accordingly, the invention is not limited except as by the appended claims.

We claim:

1. A computer-implemented method for branching from an original virtual machine to one or more clone virtual machines to consider divergent states, the method comprising:

receiving application code for execution on the original virtual machine, wherein the application code includes at least one branch that results in two or more possible states of the virtual machine;

executing the original virtual machine including the received application code;

identifying a branch in the application code running on the original virtual machine that results in two or more possible states of the virtual machine by obtaining information from the application code that indicates a location where the application will branch into multiple possible states;

creating one or more clone virtual machines that duplicate a current state of the original virtual machine and then each process one path of the branch to explore a subsequent state in the created clone virtual machine;

setting up each clone virtual machine to execute a different path of the identified branch;

executing the original virtual machine and cloned virtual machines to explore at least two paths of the identified branch in parallel; and receiving at least one execution result from the cloned virtual machines, wherein the preceding steps are performed by at least one processor.

2. The method of claim 1 wherein receiving the application code comprises receiving application code that changes the state of the machine and that includes a branch based on conditions evaluated at runtime.

3. The method of claim 1 wherein executing the original virtual machine comprises a hypervisor directing execution of multiple virtual machines sharing the same physical resources.

4. The method of claim 1 wherein executing the original virtual machine comprises executing the original virtual machine until a branch is identified that potentially changes the virtual machine state beyond a predetermined threshold and determining whether the cloned virtual machine will affect any resources outside of the original virtual machine instance.

5. The method of claim 1 wherein identifying the branch comprises automatically identifying the branch using a code analysis tool.

6. The method of claim 1 wherein identifying the branch comprises receiving an invocation of an application programming interface (API) that identifies two or more branch paths whereby the system can clone the virtual machine and execute the paths in parallel.

7. The method of claim 1 wherein creating clone virtual machines comprises setting up one or more virtual machine specifications that identify virtual hardware, copying memory state of the original virtual machine, and copying one or more disks attached to the original virtual machine.

8. The method of claim 1 wherein creating clone virtual machines comprises pausing execution of the original virtual machine and copying one or more physical machine files associated with the virtual machine.

9. The method of claim 1 wherein setting up each clone comprises setting up each clone with information about which path it is responsible for exploring, and then executing each clone and the original virtual machine to allow each to explore its assigned path.

10. The method of claim 1 wherein setting up each clone comprises identifying software code that the clone virtual machine will run, and setting the instruction pointer and register state of the clone virtual machine to a particular location.

11. The method of claim 1 wherein receiving at least one execution result comprises receiving an indication of a state reached by the cloned virtual machine.

12. A computer system for virtual machine branching and parallel execution, the system comprising:

a processor and memory configured to execute software instructions embodied within the following components;

a hypervisor component that shares resources of a physical computing device between two or more virtual machines and provides support for cloning virtual machines;

a scheduling component that provides scheduling of resource usage on a physical machine and resource isolation between two or more virtual machines, including an original virtual machine and a cloned virtual machine;

a VM communication component that provides one or more channels of communication between two or more virtual machines;

a branch identification component that identifies a present state and one or more subsequent states of software code that are candidates for branching an original virtual machine running the software code to evaluate the subsequent states in one or more clone virtual machines;

a state cloning component that copies state information from the original virtual machine to create one or more clone virtual machines having similar state;

a VM branching component that executes the branch by starting each created clone virtual machine and identifying a branch of execution for each clone to pursue;

a clone coordination component that coordinates actions of each clone virtual machine and the original virtual machines to allow discarding unneeded branches or merging branch results; and a results processing component that processes results produced by each virtual machine and provides the results to the clone coordination component.

13. The system of claim 12 wherein the VM communication component receives coordination information from the original virtual machine and provides coordinating instructions to one or more clone virtual machines.

14. The system of claim 12 wherein the branch identification component automatically identifies potential branches via the hypervisor by analyzing the software code.

15. The system of claim 12 wherein the state cloning component selects a subset of the state information of the original virtual machine to be used for exploring the divergent state that each clone will pursue, and copies the selected subset.

16. The system of claim 12 wherein the VM branching component informs each clone virtual machine of the branch that it will consider and then allows each virtual machine to execute to explore the divergent states.

17. The system of claim 12 wherein the clone coordination component considers the result of each clone virtual machine and transfers execution back to the original virtual machine after the exploration of states is complete.

18. The system of claim 12 wherein the results processing component captures state change information of each clone virtual machine for copying the state change information to the original virtual machine.

* * * * *